United States Patent [19]
Gupta et al.

[11] Patent Number: 5,515,475
[45] Date of Patent: May 7, 1996

[54] SPEECH RECOGNITION METHOD USING A TWO-PASS SEARCH

[75] Inventors: Vishwa N. Gupta, Brossard; Matthew Lennig, Montreal, both of Canada

[73] Assignee: Northern Telecom Limited, Montreal, Canada

[21] Appl. No.: 80,543

[22] Filed: Jun. 24, 1993

[51] Int. Cl.$^6$ ................................. G10L 5/06; G10L 9/00
[52] U.S. Cl. ..................... 395/2.51; 395/2.52; 395/2.63; 395/2.64; 395/2.65
[58] Field of Search ............................. 395/2, 2.51, 2.62, 395/2.47, 2.63, 2.52, 2.62; 381/41, 42, 43

[56] References Cited

U.S. PATENT DOCUMENTS

| | | | |
|---|---|---|---|
| 4,587,670 | 5/1986 | Levinson et al. | 381/43 |
| 5,195,167 | 3/1993 | Bahl et al. | 395/2 |
| 5,241,619 | 8/1993 | Schwartz et al. | 395/2 |
| 5,349,645 | 9/1994 | Zhao | 395/2.52 |
| 5,386,492 | 1/1995 | Wilson et al. | 395/2.61 |
| 5,390,278 | 2/1995 | Gupta et al. | 395/2.52 |

OTHER PUBLICATIONS

Bahl et al. (1989) A Fast Approximate Acoustic Match for Large Vocabulary Speech Recognition. Proceedings of Eurospeech 89: European Conference on Speech Communication and Technology. Paris: 156–158.

Bahl et al. (1992) Constructing Candidate Word Lists Using Acoustically Similar Word Groups. IEEE Transactions on Signal Processing, vol. 40, 11:2814–2816.

Lexical Access to Large Vocabularies for Speech Recognition Fissore et al., IEEE Transactions on Acoustics, Speech, and Signal Processing, vol. 37, No. 8, Aug. 1989.

Primary Examiner—Allen R. MacDonald
Assistant Examiner—Richemond Dorvil
Attorney, Agent, or Firm—Dallas F. Smith; John A. Granchelli

[57] ABSTRACT

A method of recognizing speech comprises searching a vocabulary of words for a match to an unknown utterance. Words in the vocabulary are represented by concatenated allophone models and the vocabulary is represented as a network. On a first pass of the search, a one-state duration constrained model is used to search the vocabulary network. The one-state model has as its transition probability the maximum observed transitional probability (model distance) of the unknown utterance for the corresponding allophone model. Words having top scores are chosen from the first pass search and, in a second pass of the search, rescored using a full Viterbi trellis with the complete allophone models and model distances. The rescores are sorted to provide a few top choices. Using a second set of speech parameters these few top choices are again rescored. Comparison of the scores using each set of speech parameters determines a recognition choice. Post processing is also possible to further enhance recognition accuracy. Test results indicate that the two-pass search provides approximately the same recognition accuracy as a full Viterbi search of the vocabulary network.

8 Claims, 4 Drawing Sheets

| STEP | ACTION |
|---|---|
| A) Frame Synchronous | |
| 1) | Endpointer identifies beginning of speech to start frame synch. search |
| 2) | Compute model distances for each speech frame for all models |
| 3) | Find Max. model distance for each model (e.g. 130 models=130 Max) |
| 4) | Every frame, update trellis using 1-state model, 2-frame min. duration |
| 5) | Endpointer identifies end of speech to stop reduced trellis updating |
| 6) | Sort end values for reduced trellis |
| 7) | Choose n top values for recognition candidates |
| B) Recognition Delay | |
| 8) | Use Viterbi method to rescore top n choices with model distances computed in Step 2 |
| 9) | Sort candidates by scores |
| 10) | Choose top m candidates for rescoring using LSP model distances |
| 11) | Find allophone segmentation using Cepstrum parameters |
| 12) | Compute LSP model distances of m candidates only for frames identified by step 11 with a ± 18 frame relaxation |
| 13) | Use Viterbi method to rescore with LSP model distances |
| 14) | Compare top m candidates' Cepstrum and LSP scores |
| 15) | Optional post processing to enhance accuracy |

| STEP | ACTION |
|---|---|
| A) Frame Synchronous | |
| 1) | Endpointer identifies beginning of speech to start frame synch. search |
| 2) | Compute model distances for each speech frame for all models |
| 3) | Find Max. model distance for each model (e.g. 130 models=130 Max) |
| 4) | Every frame, update trellis using 1-state model, 2-frame min. duration |
| 5) | Endpointer identifies end of speech to stop reduced trellis updating |
| 6) | Sort end values for reduced trellis |
| 7) | Choose n top values for recognition candidates |
| B) Recognition Delay | |
| 8) | Use Viterbi method to rescore top n choices with model distances computed in Step 2 |
| 9) | Sort candidates by scores |
| 10) | Choose top m candidates for rescoring using LSP model distances |
| 11) | Find allophone segmentation using Cepstrum parameters |
| 12) | Compute LSP model distances of m candidates only for frames identified by step 11 with a ± 18 frame relaxation |
| 13) | Use Viterbi method to rescore with LSP model distances |
| 14) | Compare top m candidates' Cepstrum and LSP scores |
| 15) | Optional post processing to enhance accuracy |

*Fig. 3*

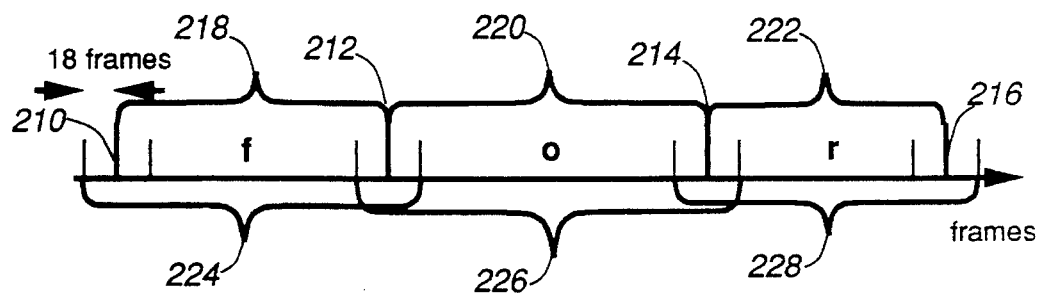
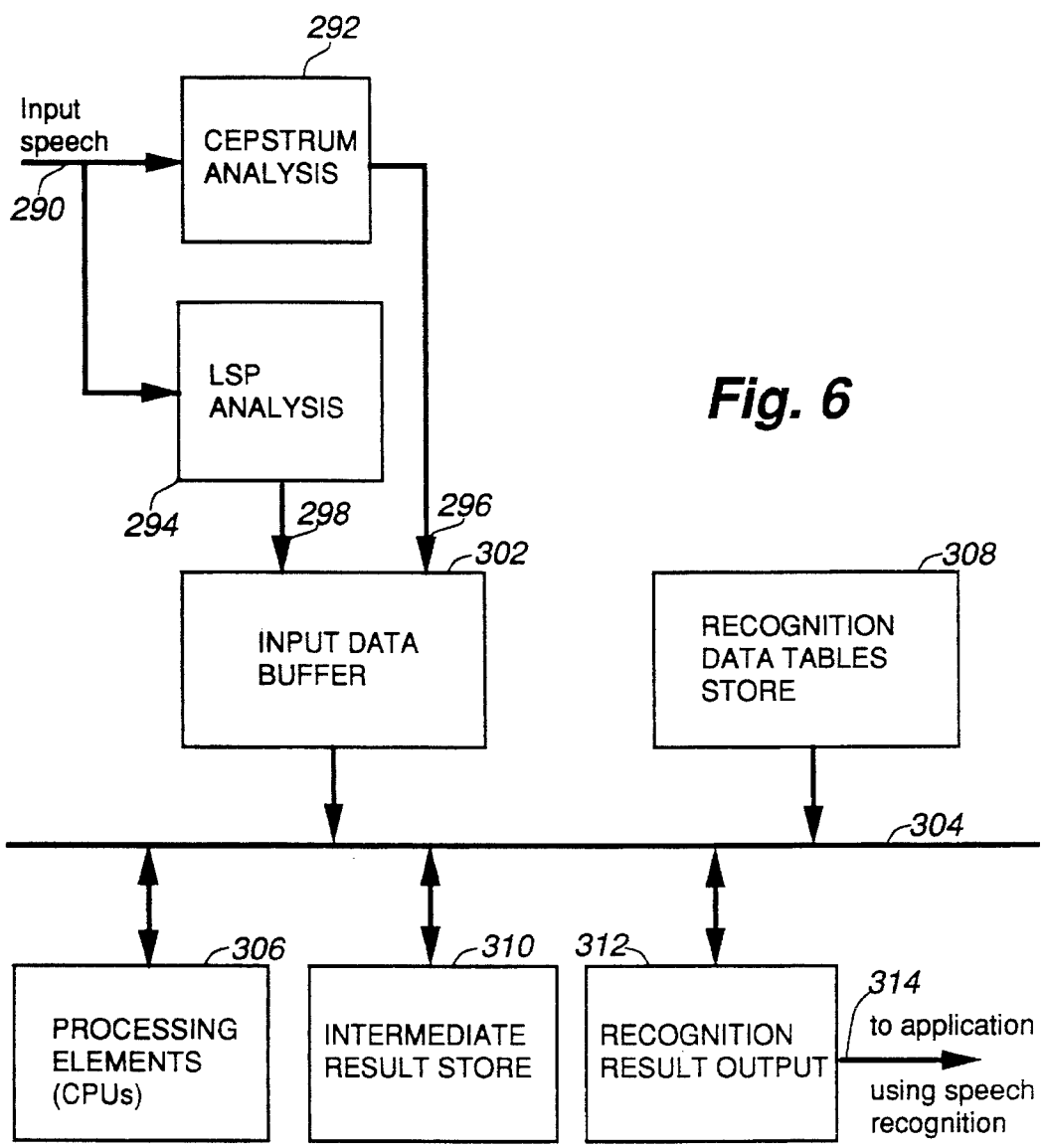
Fig. 5
Fig. 6

SPEECH RECOGNITION METHOD USING A TWO-PASS SEARCH

BACKGROUND OF THE INVENTION

In speech recognition it is well known to represent recognition vocabulary as a network of interconnected nodes. Branches between nodes may be parts of words, phonemes or allophones. Allophone models are context dependent phoneme branches between nodes may be parts of words phonemes or models. The allophones and phonemes are often represented by Hidden Markov Models (HMM). Thus any vocabulary word can be represented as a chain of concatenated HMM. Recognition of an unknown utterance involves the computation of the most likely sequence of states in the HMM chain. For medium to large vocabulary speech recognition systems, this computation represents a very large computational load.

The well known Viterbi method evaluates the probabilities for the vocabulary network by establishing a trellis. There is a trellis associated with each branch in the vocabulary network. The trellis having as its axes frame number as the abscissa and model state as the ordinate. The trellis has as many states associated with it as the number of states in the corresponding allophone model. For example, a ten-state allophone model will have ten states associated with every branch in the vocabulary network with that label. The total number of operations per frame for each trellis is proportional to the total number of transitions in the corresponding model. Thus, in the ten-state allophone model with 30 transitions, the total number of operations involved in the Viterbi method is about 50 (30 sums for estimating 30 transitions plus 20 maximums to determine a best transition at each state).

The well known Viterbi method can be used for finding the most likely path through the vocabulary network for a given utterance. However, there are two problems associated with the Viterbi method. First, the method is computationally complex because it evaluates every transition in every branch of the entire vocabulary network and, therefore, hardware cost is prohibitive or expensive. Computational complexity translates into cost/channel of speech recognition. Second, the Viterbi method provides only a single choice, and to provide alternatives increases computation and memory requirement even further. A single choice also eliminates the option of providing post processing refinements to enhance recognition accuracy.

Proposals to reduce the computational load resulting from these 50 operations per model have been put forward. Bahl et al. (1989) (A Fast Approximate Acoustic Match for Large Vocabulary Speech Recognition. Proceedings of Eurospeech 89: European Conference on Speech Communication and Technology. Paris: 156–158), propose reordering the computation for each transition by using a single transition probability for each HMM model (picking the transition with the highest likelihood). Thus, instead of adding different log observation probabilities at the three possible trellis transitions and then taking the maximum, the maximum is taken first over the three trellis values, then the log observation probability is added. This reduces the computation from 5 to 3 per transition or from 50 to 30 for the 10-state model. This is a reduction in computation, but it is not sufficient to allow a response after an acceptable delay.

Another proposal by Bahl et al. (1992) (Constructing Candidate Word Lists Using Acoustically Similar Word Groups. IEEE Transactions on Signal Processing, Vol. 40, 11:2814–2816), also attempts to reduce this computational load. This scheme uses a three-state model, rather than a more complex topology, for initial scoring with the Viterbi method, then uses the complex topology for rescoring. This proposal may actually increase the computational load. For example, if the retrained three-state model has as many mixtures as the complex topologies, then equal numbers of log observation probabilities must be computed twice, once for the three-state models and once for the complex topologies. Total memory requirements for storing the two sets of models would also increase.

The time taken to find the most likely path, thereby matching a vocabulary word to the unknown utterance, becomes the recognition delay of the speech recognition system. To be able to respond within acceptable delays using cost effective hardware computing platforms requires a less complex recognition method. Such a method must provide a reduction in the computational burden and the consequent time delay, without sacrificing accuracy of the recognition, represents a significant advance over the state of the art.

SUMMARY OF THE INVENTION

An object of the present invention is to provide an improved speech recognition method.

In accordance with an aspect of the present invention there is provided a speech recognition method comprising the steps of: providing a first set of allophone models for use with acoustic parameter vectors of a first type; providing a second set of allophone models for use with acoustic parameter vectors of a second type; providing a network representing a recognition vocabulary, wherein each branch of the network is one of the allophone models and each complete path through the network is a sequence of models representing a word in the recognition vocabulary; analyzing an unknown utterance to generate a frame sequence of acoustic parameter vectors for each of the first and second types of acoustic parameter vectors; providing a reduced trellis for determining a path through the network having a highest likelihood; computing model distances for each frame of acoustic parameter vectors of the first type for all allophone models of the first set; finding a maximum model distance for each model of the first set; updating the reduced trellis for every frame assuming each allophone model is one-state model with a minimum duration of two frames and a transition probability equal to its maximum model distance; sorting end values from the reduced trellis of each path through the vocabulary network; choosing a first plurality of candidates for recognition having the highest end values; rescoring the first plurality of candidates using a full Viterbi method trellis corresponding to the vocabulary network with the model distances computed for the first set of allophone models; sorting candidates by score in descending order; choosing a second plurality of candidates smaller than the first plurality from the first plurality, for further rescoring using the second set of allophone models and second type of acoustic parameter vectors; finding allophone segmentation using the first type of acoustic parameter vectors to identify frames for model distance computations for the second type of acoustic parameter vectors; computing model distances for the frames of acoustic parameter vectors of the second type identified for the allophone models of the second set found in the second plurality of candidates; rescoring the second plurality of candidates using the Viterbi method with the model distances computed for the allophone models of the second set; and comparing the second plurality of candidates' scores for acoustic parameter vectors of first and second types to select a recognition candidate.

In accordance with another aspect of the present invention there is provided a speech recognition method comprising the steps of: providing a first set of allophone models for use with Cepstrum parameter vectors; providing a second set of allophone models for use with LSP parameter vectors; providing a network representing a recognition vocabulary, wherein each branch of the network is one of the allophone models and each complete path through the network is a sequence of models representing a word in the recognition vocabulary; providing a reduced trellis for determining a path through the network having a highest likelihood; analyzing an unknown utterance to generate a frame sequence of both Cepstrum and LSP parameter vectors; computing of Cepstrum model distances for each frame for all Cepstrum allophone models; finding a maximum model distance for each model; updating the reduced trellis for every frame assuming a one-state model with a minimum duration of two frames and a transition probability equal to its maximum model distance; sorting end values of each vocabulary network path for the reduced trellis; choosing top n values to provide n candidates for recognition; rescoring the top n candidates using a full viterbi method trellis with the computed model distances; sorting candidates by score in descending order; choosing the top m candidates for further rescoring using the LSP parameter vectors where m is less than n; finding allophone segmentation using Cepstrum parameters to identify frames for model distance computations for LSP parameters; computing LSP model distances for frames identified and for the LSP models found in the m candidates; rescoring the m candidates using the Viterbi method with the LSP model distances computed; and comparing the top m candidates' scores for Cepstrum and LSP parameters to select a recognition candidate.

According to the present invention a two-pass search is used. The first pass uses a reduced one-state model whose transition probabilities are assigned the maximum value computed for the observation probability of the corresponding allophone model. There is a one-to-one correspondence between this reduced model and the corresponding allophone model. This one-state reduced model has its minimum duration constrained to a few frames. Conveniently, either two or three frame minimum durations may be used.

An advantage of the present invention is simplifying the complexity of the recognition method enough to allow the use of cost effective processing hardware while maintaining recognition accuracy.

BRIEF DESCRIPTION OF THE DRAWINGS

The present invention will be understood from the following description with reference to the drawings in which:

FIG. 3 illustrates, in a chart, a method of speech recognition in accordance with an embodiment of the present invention;

FIG. 5 graphically illustrates allophone segmentation from Cepstrum parameters and frames used for LSP model distance computation referred to in FIG. 3; and FIG. 6 illustrates, in a block diagram, a typical speech recognizer for using the method of speech recognition in accordance with an embodiment of the present invention.

Referring to FIGS. 1a and 1b there are illustrated portions of the vocabulary network in accordance with an embodiment of the present invention. In FIG. 1a each path 10, 12, and 14 begins at an entry node 16. The path 10 includes a branch 18 representing the allophone r from the node 16 to a node 20, a branch 22 representing the allophone a from the node 18 to a node 24, a branch 26 representing the allophone b from the node 24 to a node 28, a branch 30 representing the allophone I from the node 28 to a node 32, and a branch 34 representing the allophone d from the node 32 to an exit node 36.

Figure 1A:
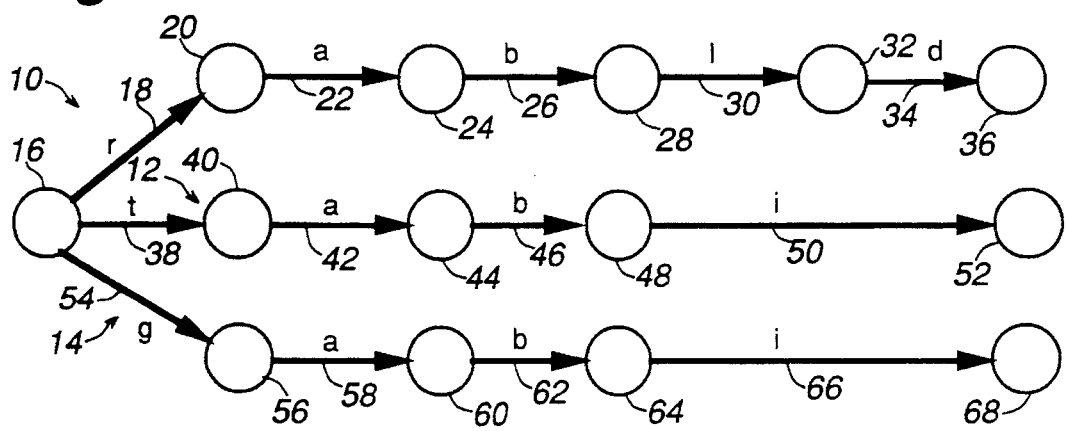
FIGS. 1a and 1b illustrate portions of the vocabulary network in accordance with an embodiment of the present invention.

Similarly, the path 12 includes a branch 38, a node 40, a branch 42, a node 44, a branch 46, a node 48, a branch 50 and an exit node 52 and the path 14 includes a branch 54, a node 56, a branch 58, a node 60, a branch 62, a node 64, a branch 66, and an exit node 68.

Figure 1B:
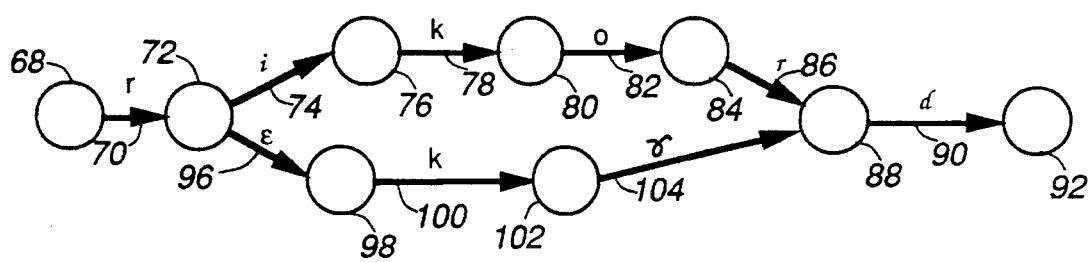

The vocabulary network is generally a tree structure as shown in FIG. 1a but may have paths that recombine as illustrated by FIG. 1b representing two allophone transcriptions of the word 'record'.

The transcriptions for record are represented by: an entry node 68, a branch 70, a node 72, a branch 74, a node 70, a branch 78, a node 80, a branch 82, a node 84, a branch 86, a node 88, a branch 90 and an exit node 92; and a branch 93, a node 94, a branch 96, a node 98, a branch 100, a node 102, a branch 104, then the node 88, the branch 90, and the exit node 92.

Each branch of the vocabulary network is represented by a hidden Markov model.

Figure 2:
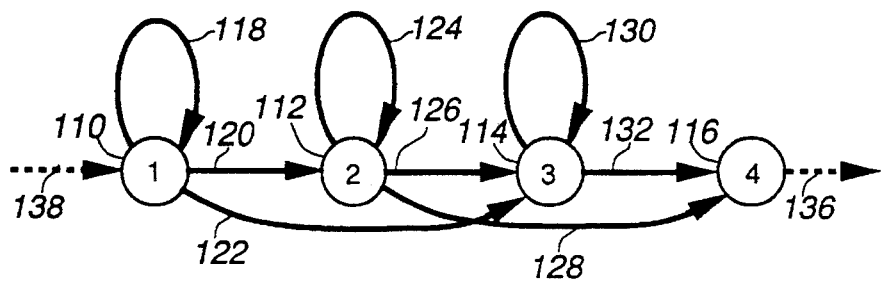
FIG. 2 illustrates a four-state hidden Markov model (HMM) representing an allophone in accordance with an embodiment of the present invention.

Referring to FIG. 2, there is illustrated a four-state Hidden Markov Model (HMM) representing an allophone in accordance with an embodiment of the present invention. The four-state HMM includes first, second, third, and fourth states 110, 112, 114, and 116, respectively. Transitions from states can in most instances be of three types: self, next-state, and skip-next-state. For the first state 110, the self is a transition 118, the next-state is a transition 120 and the skip-next-state is a transition 122. Similarly, the second state 112 has a self transition 124, a next-state transition 126, and a skip-next-state transition 128. As the fourth state 116 represents an exit state, the third state 114 has no skip-next-state transitions. Hence, the third state 114 has a self transition 130 and a next-state transition 132. The fourth state 116 being an exit state has only an inter-model transition 136. Similarly, the first state 110 being an entry state also has an inter-model transition 138. The inter-model transitions 136 and 138 allow concatenation of models into a chain representing vocabulary words.

Referring to FIG. 3, there is illustrated a chart of a speech recognition method in accordance with an embodiment of the present invention. The chart provides steps and actions that occur in two time frames: the first is in real time with respect to the incoming speech and is labeled A) Frame Synchronous; the second is processing time following speech reception and is labeled as B) Recognition Delay.

Part A) includes seven steps. Step 1) is identifying, with an endpointer, the beginning of words or phrases to start a frame synchronous search method by initializing a reduced trellis. Step 2) is the computing of Cepstrum model distances for each frame for all allophone models. Step 3) is finding a maximum model distance for each model (e.g. 130 models means 130 maximum found). Step 4) is updating the reduced trellis for every frame assuming a one-state model with a minimum duration of two frames. The transition probability for this model is the same as the maximum model distance computed in Step 3. Step 5) is identifying, with the endpointer, the end of speech to stop the updating of the reduced trellis. Step 6) is sorting end values of each vocabulary network path for the reduced trellis. Step 7) is choosing top n values to provide n candidates for recognition, for example, a typical value for n is 30. This completes the frame synchronous part of the speech recognition method in accordance with an embodiment of the present invention.

Part B) includes seven steps (Steps 8–14) and may include one or more additional steps (as represented by Step 15) to enhance recognition accuracy. Step 8) is rescoring the top n candidates using the Viterbi method with the model distances computed in Step 2). Having reduced the number of recognition candidates from every vocabulary word down to n candidates in the frame synchronous part, the computationally complex Viterbi method can be used efficiently to rescore each of those n candidates with the complete set of model distances computed in Step 2. Step 9) is sorting candidates by score in descending order. Step 10) is choosing the top m candidates for further rescoring using alternate parameters, for example, LSP (line spectral pair) parameters. A typical value of m is 3. Step 11) is finding allophone segmentation using Cepstrum parameters. These segment boundaries are used to limit the frames used to compute model distances in Step 12. Because of the computational burden imposed by the computation of model distances, without constraining to the frames identified in Step 11) and the candidates identified in Step 10), the use of alternative parameters would introduce an unacceptable additional delay. Step 12) is computing LSP model distances for the m candidates. For example, in FIG. 5, the top brackets show segmentation produced using Cepstrum, while the bottom brackets show the frames used for computing LSP model distances. Step 13) is rescoring the m candidates using the Viterbi method with the LSP model distances computed in Step 12. The segment boundaries are constrained to be within 230 msec (18 frames) of the segment boundaries obtained in Step 11). Step 14) is comparing the top m candidates' scores for Cepstrum and LSP parameters. Step 14) may conveniently include multiplying together the probabilities resulting from Cepstrum and LSP parameters for each respective candidate. For example, for m=3:

$(P_{1CeP}) \times (P_{1LSP}) = P_{1Combined}$ } Choose the word $(P_{2CeP}) \times (P_{2LSP}) = P_{2Combined}$ } with the greatest $(P_{3CeP}) \times (P_{3LSP}) = P_{3Combined}$ } combined probability.

Step 15) represents additional optional post-processing to enhance accuracy of the selection. As only a few candidates remain further optional post processing may be included in the recognition method without incurring a significant additional computational burden, and hence without significantly increasing the recognition delay. For example, the optional post processing may include using allophone duration constraints to enhance the recognition accuracy.

The embodiment described uses a one-state model of two frames minimum duration for the frame synchronous search.

Referring to Table A, there is presented data for inclusion rate for the correct choice for minimum durations of two and three frames for a 4321 word test set. Table B provides recognition accuracy on the 4321 word test set after rescoring the top n candidates using the Viterbi method.

TABLE A

| Min. Duration | 2 frames | 2 frames | 3 frames | 3 frames |
|---|---|---|---|---|
| Fine Endpointer | On | Off | On | Off |
| Top Choice | 84.0% |  | 85.2% |  |
| Top 10 Inclusion Rate | 93.8% | 93.7% | 95.1% | 95.0% |
| Top 20 Inclusion Rate | 95.3% |  | 96.4% |  |
| Top 30 Inclusion Rate | 96.2% | 96.1% | 97.1% |  |

TABLE B

| Min. Duration | 2 frames | 3 frames | 3 frames |
|---|---|---|---|
| Fine Endpointer | Off | On | Off |
| Rescoring Top 10 Choices | 89.6% | 89.7% | 89.9% |
| Rescoring Top 30 Choices | 90.0% | 89.9% |  |

As can be seen from the data of Table A, the inclusion rate for the correct choice is higher for a minimum duration of three frames than it is for two frames. However, as is evident from the data presented in Table B, after rescoring the n top candidates using the Viterbi method, the two recognizers give virtually the same recognition accuracy. Hence, because the two-frame recognizer requires less computing, it is preferred, if a rescoring method can be found that will perform better than the Viterbi method, by taking advantage of the three-frame duration's high inclusion rate, the higher computing burden of the three-frame duration will be worthwhile.

Figure 4:
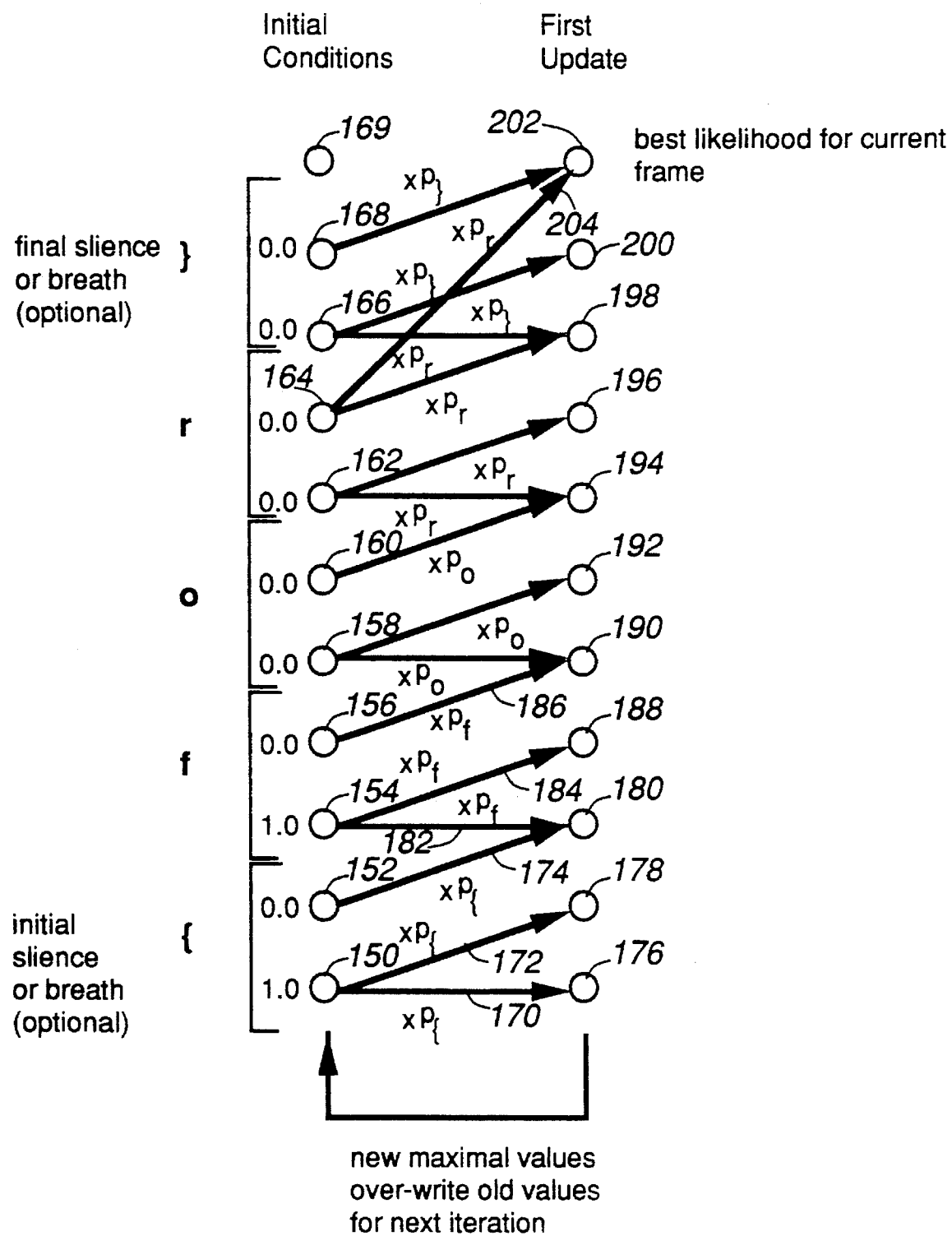
FIG. 4 graphically illustrates a reduced trellis referred to in FIG. 3.

Referring to FIG. 4, there is graphically illustrated the reduced trellis of Step 4 of FIG. 3. To produce the reduced trellis, a one-state model having a duration of two frames is used. Thus, as an example, an allophone transcription of the word 'for' is plotted vertically, with each allophone being allotted two points on the axis. The transition probability used for each allophone model is the maximum found during the actual model distance calculations. Hence, the one-state models for the reduced trellis do not require additional computing of model distances, only determining the maximum of those distances calculated for each model. However, these model distances are stored for use in the second pass.

Initial conditions of the trellis are set, then for each frame, the trellis is updated by applying the maximum transition probability to each transition in every branch in the vocabulary network.

By way of a simplified example, consider the allophone transcription of the vocabulary word 'for'. Initial conditions are set by assigning probabilities of '1' to the initial state 150 of the silence model ({) and initial state 154 of the model (f) and by assigning probabilities of '0' everywhere else on the trellis vertical axis, 156–168. For each branch (allophone model) in the vocabulary network, three operations are performed to update the trellis, two multiplications and one compare. Thus, the step of updating the trellis consists of multiplying the initial probabilities by the maximum transitional probabilities for each allophone in the transcription. In the example, the maximum transitional probability, p{, multiplies the initial value of '1' for transitions 170 and 172 for one of the multiplications. The probability p{ multiplies the initial value of '0' for transition 174. The transitions 170, 172, and 174 yield three new states 176, 178, and 180, respectively. The compare is made at the state representing a beginning state of a next allophone, in this instance the state 180. The probability value at the state 180 resulting from the transition 176 is compared to the value resulting from a transition 182 from the initial state 154 of allophone (f). Whichever probability value is greater is retained for the state 180 for the next iteration of trellis updating. As in the case of the silence model ({), the transitions of the (f) model are computed. The initial value of '1' for the state 154 is multiplied by the maximum transitional probability for the allophone (f), pf, for each of transitions 182 and 184. The initial value of '0' for the state 156 is multiplied by the maximum transitional probability for the allophone (f), pf, for transition 186. The transitions 182, 184, and 186 yield three new states 180, 188, and 190, respectively. Similarly, probabilities for new states 192–202 are computed. To complete each trellis update cycle, the values of states 176–202 are copied back into states 150–169 before the start of processing for next frame.

The initial probabilities of 1 for initial states 150 and 154 indicate the possibility that the word 'for' may have an initial silence or breath. Likewise, the transition 204 from the state 164 to the state 202, indicates that the final silence or breath is also optional. The state 202 retains the value representing the best likelihood for the current frame.

Throughout the detailed description, transitional probabilities have been described as ranging from '0' to '1' and new values in trellis updating as being derived by multiplication of the current value by the next transitional probability. However, as is customary in the art of speech recognition, typically transitional probabilities are represented by logarithms so that multiplications of probabilities can be carried out on computing platforms by computationally simpler additions.

Computation of model distances is a complex task and, hence, imposes a large burden on computing resources. In order to compute LSP model distances during the recognition delay portion of the speech recognition method without an unacceptable increase in that delay, the number of frames for which the computations are made is constrained.

The steps of finding allophone segmentation using Cepstrum parameters and computing LSP model distances are described with reference to FIG. 5. As an example, the allophone transcription for the vocabulary word 'for' is graphically illustrated in FIG. 5. The horizontal axis represents frames of speech. The Cepstrum parameter allophone segments are indicated by bars 210, 212, 214, and 216, denoting the segmentation of allophones f, o, and r as indicated by brackets 218, 220, and 222, respectively. This corresponds to Step 11) of FIG. 3. In the example of FIG. 5, the frames for allophones whose model distances are to be computed are constrained to within 18 frames (230 ms) of the segment boundaries determined using the Cepstrum parameters. Thus, the LSP model distances computation for allophones f, o, and r are computed over the frames indicated by brackets 224, 226, and 228, respectively.

Referring to FIG. 6, there is illustrated in a block diagram a typical speech recognizer configured to use the speech recognition method of the present invention. The speech recognizer includes an input for speech 290, estimators for Cepstrum and LSP parameters 292, and 294, respectively, having parameter outputs 296 and 298, respectively, to an input data buffer 302. The input data buffer is connected to a data bus 304. Also connected to the data bus are processing elements 306, a recognition data tables store 308, an intermediate result store 310, and a recognition result output block 312 having an output 314.

In operation, the speech applied to the input 290 is analyzed in Cepstrum analyzer 292 and LSP analyzer 294 to produce Cepstrum and LSP parameter vector output via 296 and 298, respectively, to the input data buffer 302 every 12.75 msec. For the frame synchronous computations, processing elements 306 compute model distances for each frame of speech data for all Cepstrum allophone models stored in the recognition data tables store 308. The computed model distances are stored in the intermediate result store 310 for use later in the Viterbi rescoring of the top n choices. The trellis is established in the intermediate results store 310 and is updated for each frame. Once the top n choices from the first pass are determined the recognition delay portion of the recognition process begins. The stored Cepstrum model distances are used by the Viterbi method to rescore the top n choices with the ordered list stored in the intermediate result store 310. The top n choices are again reordered using Viterbi scores. The top m choices are then rescored using LSP parameters from the input data buffer 302. LSP model distances are computed by processing elements 306 for the LSP allophone models found in the top m choices using those stored in the recognition data tables store 308. For each allophone model, only the frames provided by the Cepstrum segmentation are used. The computed model distances are stored in the intermediate result store 310 and used in the Viterbi rescoring of the top m choices. Comparison of the Cepstrum and LSP top m choices takes place to provide a recognition stored in the recognition results output 312. The result is passed to an application via output 314 as a recognition. As described hereinabove further post processing may be done to enhance recognition accuracy.

A hardware implementation of the speech recognizer of FIG. 6 uses six TMS 320C31 microprocessors by Texas Instruments for processing elements 306, and a total memory of about 16 Mbytes which is used to provide the input data buffer 302, the recognition data table store 308 and intermediate result store 310.

Numerous modifications, variations, and adaptations may be made to the particular embodiments of the invention described above without departing from the scope of the invention, which is defined in the claims.

What is claimed is:

1. A speech recognition method comprising the steps generating a first set of allophone models for use with acoustic parameter vectors of a first type;

generating a second set of allophone models for use with acoustic parameter vectors of a second type;

providing a network representing a recognition vocabulary, wherein each branch of the network is one of the allophone models and each complete path through the network is a sequence of models representing a word in the recognition vocabulary;

analyzing an unknown utterance to generate a frame sequence of acoustic parameter vectors for each of the first and second types of acoustic parameter vectors;

generating a reduced trellis for determining a path through the network having a highest likelihood;

computing model distances for each frame of acoustic parameter vectors of the first type for all allophone models of the first set;

finding a maximum model distance for each model of the first set;

updating the reduced trellis for every frame assuming each allophone model is one-state model with a minimum duration of two frames and a transition probability equal to its maximum model distance;

sorting end values from the reduced trellis of each path through the vocabulary network;

choosing a first plurality of candidates for recognition having the highest end values;

rescoring the first plurality of candidates using a full viterbi method trellis corresponding to the vocabulary network with the model distances computed for the first set of allophone models;

sorting candidates by score in descending order;

choosing a second plurality of candidates smaller than the first plurality from the first plurality, for further rescoring using the second set of allophone models and second type of acoustic parameter vectors;

finding allophone segmentation using the first type of acoustic parameter vectors to identify frames for model distance computations for the second type of acoustic parameter vectors;

computing model distances for the frames of acoustic parameter vectors of the second type identified for the allophone models of the second set found in the second plurality of candidates;

rescoring the second plurality of candidates using the Viterbi method with the model distances computed for the allophone models of the second set; and comparing the second plurality of candidates' scores for acoustic parameter vectors of first and second types to select a recognition candidate.

2. A speech recognition method as claimed in claim 1, wherein the acoustic parameter vectors of a first type include Cepstrum parameter vectors.

3. A speech recognition method as claimed in claim 2, wherein the acoustic parameter vectors of the second type include LSP parameter vectors.

4. A method of speech recognition as claimed in claim 1 further comprising the steps of:

identifying, with an endpointer, the beginning of words or phrases prior to the step of generating the reduced trellis; and identifying, with the endpointer, the end of speech to stop the updating of the reduced trellis.

5. A speech recognition method comprising the steps of:

generating a first set of allophone models for use with Cepstrum parameter vectors;

generating a second set of allophone models for use with (line spectral pair) parameter vectors;

generating a network representing a recognition vocabulary, wherein each branch of the network is one of the allophone models and each complete path through the network is a sequence of models representing a word in the recognition vocabulary;

generating a reduced trellis for determining a path through the network having a highest likelihood;

analyzing an unknown utterance to generate a frame sequence of both Cepstrum and LSP parameter vectors;

computing of Cepstrum model distances for each frame for all Cepstrum allophone models;

finding a maximum model distance for each model;

updating the reduced trellis for every frame assuming a one-state model with a minimum duration of two frames and a transition probability equal to its maximum model distance;

sorting end values of each vocabulary network path for the reduced trellis;

choosing top n values to provide n candidates for recognition;

rescoring the top n candidates using a full Viterbi method trellis with the computed model distances;

sorting candidates by score in descending order;

choosing the top m candidates for further rescoring using the LSP parameter vectors, where m is less than n;

finding allophone segmentation using Cepstrum parameters to identify frames for model distance computations for LSP parameters;

computing LSP model distances for frames identified and for the LSP models found in the m candidates;

rescoring the m candidates using the Viterbi method with the LSP model distances computed; and comparing the top m candidates' scores for Cepstrum and LSP parameters to select a recognition candidate.

6. A method of speech recognition as claimed in claim 5 further comprising the steps of:

identifying, with an endpointer, the beginning of words or phrases prior to the step of generating the reduced trellis; and identifying, with the endpointer, the end of speech to stop the updating of the reduced trellis.

7. A method of speech recognition as claimed in claim 6 wherein the step of comparing the top m candidates includes the steps of multiplying together the probabilities resulting from Cepstrum and LSP parameters for each respective candidate and choosing the candidate with the highest combined probability as the recognition candidate.

8. A method of speech recognition as claimed in claim 7 wherein the frames are constrained to be within 18 frames of the segment boundaries found using the Cepstrum parameters.

* * * * *